United States Patent [19]
Grindstaff et al.

[11] 3,840,996
[45] Oct. 15, 1974

[54] PROCESS FOR DRYING MINERAL CONTAINING AQUEOUS PROTEIN SOLUTIONS

[75] Inventors: Donald A. Grindstaff, Minnetonka, Minn.; Joseph S. Steinreich, Olympia Fields, Ill.; Leo B. Post, New City, N.Y.

[73] Assignee: Stauffer Chemical Company, Westport, Conn.

[22] Filed: Aug. 20, 1973

[21] Appl. No.: 389,613

[52] U.S. Cl. .................................. 34/9, 260/112
[51] Int. Cl. .............................................. F26b 3/00
[58] Field of Search ................. 34/9, 95; 260/112 R

[56] References Cited
UNITED STATES PATENTS
3,414,980  12/1968  Nezbed ................................... 34/9
3,732,627  5/1973  Wertheim ............................... 34/9

*Primary Examiner*—John J. Camby

[57] ABSTRACT

A process for drying a mineral containing aqueous protein solution in an atomizing dryer wherein there is added to the drying chamber, during atomization of the solution, a drying agent, in dry solids form, at a concentration between about 1% to about 10% by weight of solids in the solution, allowing the drying atmosphere in the dryer to dry the solids in the atomized solution, and recovering the dried product including the drying agent, the product exhibiting improved physical and chemical properties.

19 Claims, No Drawings

PROCESS FOR DRYING MINERAL CONTAINING AQUEOUS PROTEIN SOLUTIONS

BACKGROUND OF THE INVENTION

This invention relates to a new process for drying mineral containing aqueous protein solutions and, particularly, modified cheese whey derived by the molecular sieve fractionation of partially delactosed cheese whey mother liquor.

In addition, this invention relates to the dried product obtained by the process of the present invention.

Because of the increasing requirement for protein sources throughout the world, various processes have been recently developed to extract protein from sources which heretofore have been considered as waste materials. Particular reference is made to the Dienst-Attebery U.S. Pat. No. 3,547,900 which discloses a method of separating protein from cheese whey by means of a molecular sieve resin. The development of these separation techniques has also raised further processing problems. Other products are obtained during the processing which are not adaptable to present known techniques of material handling.

Particularly, and in the processing of cheese whey by molecular sieve resin in accordance with U.S. Pat. No. 3,547,900, a low molecular weight fraction (about 5–10 percent solids) is obtained which has a solids composition of mainly lactose and minerals with residual protein. The solids in this low molecular weight fraction can be described more particularly by the following typical chemical analysis:

| | |
|---|---|
| Lactose, % | 40–50 |
| Minerals, % | 25–35 |
| Protein, (N × 6.38), % | 15–20 |
| Lactic Acid, % | 7–10 |
| Citric Acid, % | 3–6 |
| Fat, % | Less than 1 |
| Moisture | Less than 5 |
| pH | 6.6–7.2 |

Heretofore, two primary problems have been associated with the conventional drying of this low molecular weight fraction. First of all, conventional drying techniques cannot be utilized effectively due to undesirable particle adherence to the dryer walls. Particle adherence to the dryer walls tends to cause general inefficient dryer operation, since the flow through the dryer becomes unduly restricted. Also, particle adherence to the dryer walls causes the formation of burned particles, thereby detracting from the quality of the final product.

The second problem associated with the conventional spray drying of this low molecular weight fraction relates to the undesirable level of hygroscopicity exhibited by this product. More specifically, the hygroscopicity of this product adversely affects product packaging in that the dried particles exhibit such undesirable flow characteristics that packaging as for example, bagging, becomes difficult to accomplish using industrial equipment. Also, the undesirable level of hygroscopicity tends to detract from the potential use of this product in food applications, since once the package is opened, the dried particles immediately absorb moisture and cake.

It is known that flow-conditioning and/or anticaking agents can be used to improve the flow properties and/or reduce caking properties of many dried materials. Generally, these agents are dry blended with the dried particles subsequent to drying and prior to packaging by appropriate blending techniques. However, and since this low molecular weight fraction dried by conventional methods is hygroscopic, the conventional dry blending methods of adding flow-conditioning and/or anticaking agents are ineffective in terms of overcoming these problems.

Flow conditioning agents have also been added to the spray dryer during drying for convenience to avoid the additional dry blending step.

It has also been found that dry solid addition of drying agents to the dryer feed solution prior to spray drying is ineffective in terms of reducing dried particle adherence to the walls of the drying chamber. Also, this method of addition has been found to be ineffective in terms of reducing the hygroscopicity of the dried product.

It has now been found that mineral containing aqueous protein solutions can be effectively spray dried by the process of the present invention. By means of the process of the present invention, dry particle adherence to the walls of the drying chamber and hygroscopicity of the dried product are significantly reduced.

BRIEF SUMMARY OF THE INVENTION

In accordance with the present invention there is provided an improved process for drying mineral containing aqueous protein solutions in an atomizing dryer comprising atomizing the mineral containing aqueous protein solution in the drying chamber of an atomizing dryer, contacting the atomized solution in the drying chamber with a drying atmosphere containing a drying agent selected from the group consisting of: tricalcium phosphate, dicalcium phosphate, kaolin, diatomaceous earth, silica gel, calcium silicate hydrate, or mixtures thereof, wherein said drying agent is added to the drying atmosphere at a solids feed rate equivalent to between about 1 percent to about 10 percent by weight of the modified cheese whey solids, allowing the drying atmosphere to dry the solids contained in the atomizing solution, and recovering the solids, the thus dried solids containing the solids from the solution in combination with the drying agent. The preferred mineral containing aqueous protein solution is modified cheese whey and, more preferably, the modified cheese whey is the low molecular weight fraction derived by the molecular sieve fractionation of partially delactosed cheese whey mother liquor. The preferred drying agent is tricalcium phosphate.

In addition, this invention is also directed to the product obtained by the process of this invention. The dried products obtained by the process of the present invention can be used broadly as food additives, i.e., protein enrichers or flavor enhancers and the more preferred product derived from the low molecular weight fraction described above as a flavor enhancer, flavoring agent, or emulsifier in certain food products, for example, cheese products and meat products.

DETAILED DESCRIPTION OF THE INVENTION

The present invention is broadly directed to the drying of mineral containing aqueous protein solutions. These solutions include cheese whey, either acid or sweet, modified cheese whey, i.e., those wheys which have been processed to remove part of the mineral content or combinations thereof, hydrolyzed vegetable protein, and monosodium glutamate. The present invention has found particular use in drying the low molecular weight fraction obtained from the molecular sieve resin separation of cheese whey as described in U.S. Pat. No. 3,547,900. The invention will be further described in connection with this specific material though it is not intended that the invention should be limited thereto.

By low molecular weight fraction is meant the material obtained by passing partially delactosed cheese whey mother liquor through a bed of molecular sieve resin in accordance with U.S. Pat. No. 3,547,900 and recovering for the purposess of this invention the low molecular weight fraction containing mainly lactose, minerals, and residual proteins. The partially delactosed cheese whey mother liquor mentioned above is obtained by concentrating raw cheese whey by conventional means to a solids concentration of about 60 percent, reducing the temperature of the concentrate to induce lactose crystallization, and thereafter separating the crystalline lactose from the liquid by conventional means to thereby give partially delactosed cheese whey mother liquor. The raw cheese whey mentioned above can be acid cheese whey, sweet cheese whey, or mixtures thereof. More particularly, the raw cheese whey can be cottage cheese whey, casein cheese whey, cheddar cheese whey, mozzarrella cheese whey, swiss cheese whey, or mixtures thereof. Preferably, the raw cheese whey mentioned above contains a mixture of cottage cheese whey and cheddar cheese whey.

Generally, the low molecular weight fraction feed of the present invention contains a solids content between about 25 percent to about 35 percent weight basis. Preferably, the feed contains a solids content of about 30 percent weight basis.

The drying agent used in the present invention is selected from the group consisting of tricalcium phosphate, dicalcium phosphate, kaolin, diatomacious earth, silica gel, calcium silicate hydrate, or mixtures thereof. These materials are generally characterized as heat insensitive under the drying temperatures and of fine particle size. Particle sizes of less than 35 micron are preferred. Preferably, the process of the present invention is directed to the use of phosphate drying agents, i.e., di- and tri- calcium phosphate and more preferably tricalcium phosphate.

By atomizing dryer it is meant herein any conventional dryer which effects drying of liquid by reducing or atomizing a liquid feed stream containing dissolved or suspended solids to droplet form in the presence of a drying atmosphere. This type of dryer is illustrated by a spray dryer, fluid bed dryer, or flash or vacuum dryer. More particularly, by spray dryer it is meant herein vertical spray dryer, horizontal spray dryer, or filter mat dryer. The atomizing dryer generally includes a main drying chamber, an atomizer, e.g., a spray nozzle, adapted to feed the material to be dried into a drying atmosphere within the drying chamber. The drying atmosphere is generally provided by a flow of air, usually heated, through the chamber which enters through an air inlet and exits through an air outlet. The air inlet is generally located in close proximity to the atomizer. Generally, the air flow assists in atomization. As used herein, drying atmosphere is also intended to cover a negative pressure atmosphere such as is used in a flash or vacuum evaporator.

The inlet air stream is generally heated by conventional methods to an effective drying temperature. In connection with spray dryers, the inlet air temperature is usually heated within the range from about 335°F. to about 360°F. The corresponding outlet air temperature, i.e., the temperature of the air leaving the main drying chamber, usually ranges from about 230°F. to about 240°F., depending on the specific dryer conditions desired. In general, the temperature within the dryer is not critical with the exception that the temperature must be high enough to effectively dry the product in connection with the type of dryer used yet insufficient to cause burning or browning of the product. The foregoing temperatures are the preferred temperatures for the preferred type of dryer, i.e., a spray dryer. Higher or lower temperatures may be used in other types of dryers, i.e., flash or vacuum evaporators. These paramaters as well as other conditions generally employed in the use of dryers such as feed rate, residence time, etc., can be easily discerned by one skilled in the art.

The drying agent of the present invention is added to the main drying chamber by any convenient means which effectively adds dry solids to the drying chamber at a constant regulated rate. Preferably, in connection with spray drying, it has been found that the drying agent can be effectively added to the drying chamber by means of a pneumatic screw feeder. Although the dry solids addition of drying agent can be effected at any place in the main drying chamber it has been found that the most effective results are obtained when the drying agent is added to the drying chamber in close proximity to the point at which the feed is atomized.

The drying agent of the present invention is added at a solids feed rate equivalent to between about 1 percent to about 10 percent by weight of modified cheese whey solids as feed into the dryer. Preferably, the drying agent is added at a solids feed rate equivalent to between about 2 percent to about 6 percent, by weight of modified cheese whey solids.

Broadly, the low molecular weight fraction feed of the present invention is added to the drying chamber of the preferred atomizing dryer, i.e., a spray dryer, at a pressure between about 2,900 psi to about 3,200 psi. Preferably, the feed is added to the drying chamber of the spray dryer at a pressure between about 3,000 psi to about 3,100 psi.

The product obtained by the process of the present invention can be used in food products as a flavor enhancing agent, flavoring agent, and/or emulsifying agent. More specifically, it has been found that the product derived from the low molecular weight fraction can be used in meat products, as for example, soups, stews, gravies, breadings, batters, beef patties, and imitation sausages. Also, the product derived from the low molecular weight fraction can be used in cheese dips, cheese spreads, process cheese foods, and spray dried cheeses. The invention is further illustrated in the examples which follow:

EXAMPLE 1

The low molecular weight fraction derived by molecular sieve fractionation of partially delactosed whey was obtained as follows:

To about 68,000 pounds of raw cheese whey obtained by blending on a volume basis 60 percent cheddar cheese whey and 40 percent cottage cheese whey and containing about 4,300 pounds of solids, was added about 145 pounds of dry sodium hydroxide to adjust the pH to about 7.0. The temperature of the whey as received from the cheese factory and of the blend thereof was approximately 130°F.±5°F. The pH adjusted raw cheese whey was thereafter centrifugally clarified to remove insoluble solids. About 10 percent of the original solids was lost by clarification to yield about 3,970 pounds of solids in the supernatant.

The clarified supernatant was thereafter concentrated by conventional vacuum evaporative methods to about 60 percent solids. The clarified supernatant entered the evaporator at approximately 130°F.±5°F., was heated to 155°–160°F. and left the evaporator at 105°F.±5°F. The concentrate thus obtained was then cooled to about 70°F. to effect lactose crystallization. Crystalline lactose was then removed by centrifugation to yield a partially delactosed cheese whey mother liquor. About 70 percent of the lactose originally present in raw cheese whey was removed by the above described delactosing method. The partially delactosed mother liquor contained about 40 percent solids and exhibited the following typical chemical analysis:

| | |
|---|---|
| Lactose, % | 46 |
| Protein, (N × 6.38), % | 20 |
| Mineral, % | 20 |

At this point the partially delactosed mother liquor contained about 1,900 pounds of solids and was passed through a bed containing molecular sieve resin in accordance with the process described in U.S. Pat. No. 3,547,900. The temperature of the mother liquor was approximately 70°F. Water (55°–60°F.) was applied to the bed. Two major fractions were obtained from the molecular sieve resin bed. The first fraction from the bed contained about 360 pounds of solids consisting mainly of protein with residual lactose and mineral. The low molecular weight fraction contained mainly lactose and mineral with residual protein.

Fractionation may be determined by measuring the conductivity of the eluent from the bed. Typically, the conductivity range range for the low molecular weight fraction containing modified cheese whey solids of the present invention is between about 5,000 micromhos to about 15,000 micromhos, as is shown in FIG. 7 of U.S. Pat. No. 3,547,900.

The solution containing the low molecular weight fraction (55°–60°F.) obtained by this fractionation pattern was then concentrated by conventional vacuum evaporative methods prior to drying. The evaporator was equipped with a high temperature-short time pasteurizer. The solution was heated to about 165°F. for 20 seconds to effect pasteurization. The solution at 165°F. was fed to the vacuum evaporator and concentrated to 30 percent solids and exit temperature of 125°–130°F. This concentrate was then subsequently spray dried in accordance with the process of the invention. Alternatively, the concentrate can be chilled and held for drying. The concentrate contained about 30 percent modified whey solids, or about 1,500 pounds of modified cheese whey solids.

EXAMPLE 2

The low molecular weight fraction feed obtained as described in Example 1 was dried as follows:

The low molecular weight fraction feed was dried in a vertical spray dryer having an 8 foot diameter main drying chamber, a 22 inch diameter inlet air stream orifice, a spray orifice of a diameter of 0.049 inches, a type SD swirl chamber, a feed pressure of 2,900 to 3,100 psi, and air flow of 14,000 standard cubic feet per minute (SCFM). Food grade tricalcium phosphate having a particle size of 100 percent less than 35 microns was simultaneously and separately added in dry solids form to the dryer chamber and into the air stream of the dryer by means of a pneumatic screw conveyor system whose inlet was positioned between the feed nozzle and the inlet air stream orifice of the main drying chamber. The rate of addition of the tricalcium phosphate was equivalent to 5 percent by weight of the solids in the low molecular weight fraction. The inlet air temperature was maintained between 230°F. to 240°F. Residence time in the spray dryer was approximately 6 seconds. Drying rate was approximately 200–300 pounds per hour. About 1,000 pounds of dried solids was obtained. Inspection of the dryer at the end of the run revealed no particle adherence to the walls of the drying chamber, with only slight particle buildup in the spray impingement area of the dryer of approximately ⅛ inch maximum thickness. The dried solids exhibited a negligible level of burned particles. Also, the hygroscopicity of the dried product was significantly reduced as indicated by improved flow properties during the packaging operation.

EXAMPLE 3

The low molecular weight fraction feed prepared in accordance with Example 1 was dried in a vertical spray dryer under conditions similar to those described in Example 2 except that no tricalcium phosphate was added to the drying chamber. The feed, containing about 30 percent solids, was pumped into the dryer at a pressure of about 4,000 psi through a type SF swirl chamber and a feed orifice diameter of 0.047 inches. The drying time of this run was about 30 minutes. The drying process was terminated after this short period of time due to extensive particle adherence to the walls of the spray dryer causing plugging and formation of burned particles. Only 69 pounds of dried solids were obtained during this run.

It is apparent from a comparison of Examples 2 and 3 that the drying of modified cheese whey of the present invention is improved by the dry solids addition of the drying agent tricalcium phosphate in accordance with the process of the present invention.

The invention will be further described in the claims which follow.

What is claimed is:

1. A process for drying in an atomizing dryer a mineral containing aqueous protein solution comprising:
   a. atomizing a mineral containing aqueous protein solution in the drying chamber of an atomizing dryer;
   b. contacting the atomized solution in said dryer chamber with a drying atmosphere containing a drying agent selected from the group consisting of tricalcium phosphate, dicalcium phosphate, kaolin, diatomaceous earth, silica gel, calcium silicate hydrate, or mixtures thereof, at a feed rate of said drying agent equivalent to between about 1 percent to about 10 percent by weight of solids contained in said solution;

c. allowing said drying atmosphere to dry the solids contained in said atomized solution; and d. recovering the dried solids, said dried solids containing the solids from said solution in combination with said drying agent.

2. The process of claim 1 wherein said mineral containing aqueous protein solution is derived from cheese whey.

3. The process of claim 1 wherein said mineral containing aqueous solution is the low molecular weight fraction derived from the molecular sieve fractionation of cheese whey.

4. The process of claim 3 wherein said cheese whey is acid cheese whey.

5. The process of claim 3 wherein said cheese whey is sweet cheese whey.

6. The process of claim 3 wherein said cheese whey is a blend of acid and sweet cheese whey.

7. The process of claim 1 wherein said atomizing dryer is a spray dryer.

8. The process of claim 1 wherein said drying atmosphere is heated air.

9. The process of claim 1 wherein said drying agent is dicalcium phosphate.

10. The process of claim 1 wherein said drying agent is tricalcium phosphate.

11. The process of claim 10 wherein said tricalcium phosphate has a particle size less than about 30 microns.

12. The process of claim 1 wherein said feed rate of said drying agent is between about 2 percent to about 6 percent by weight of solids.

13. The process of claim 1 wherein said drying agent is fed into said drying chamber in close proximity to the point of atomization of said solution.

14. The process of claim 1 wherein said drying agent is tricalcium phosphate, said feed rate of said drying agent is between about 2 percent to about 6 percent by weight of solids, and said drying agent is fed into said drying chamber in close proximity to the point of atomization of said solution.

15. The process of claim 14 wherein said mineral containing aqueous solution is the low molecular weight fraction derived from the molecular sieve fractionation of cheese whey.

16. A process for drying in a spray dryer a low molecular weight fraction derived from the molecular sieve fractionation of cheese whey comprising:

a. atomizing in the drying chamber of a spray dryer a solution containing a low molecular weight fraction derived from the molecular sieve fractionation of cheese whey;

b. contacting the atomized solution in said drying chamber with heated air containing tricalcium phosphate at a feed rate of tricalcium phosphate equivalent to between about 2 percent to about 6 percent by weight of solids contained in said solution;

c. allowing said heated air to dry the solids contained in said atomized solution; and d. recovering the dried solids, said dried solids containing solids from said solution in combination with said tricalcium phosphate.

17. The process of claim 16 wherein said tricalcium phosphate is fed into said drying chamber in close proximity to the point of atomization of said solution.

18. The product of the process of claim 1.

19. The product of the process of claim 16.

* * * * *